(12) United States Patent
Graham

(10) Patent No.: US 6,374,504 B1
(45) Date of Patent: Apr. 23, 2002

(54) RAFTER TOOL AND METHOD

(76) Inventor: Randal L. Graham, 320 Turnpike St., Beaver Falls, PA (US) 15010

( * ) Notice: Subject to any disclaimer, the term of this patent is extended or adjusted under 35 U.S.C. 154(b) by 0 days.

(21) Appl. No.: 09/556,195

(22) Filed: Apr. 21, 2000

(51) Int. Cl.[7] .................................................. B43L 7/10
(52) U.S. Cl. ............................ 33/464; 33/1 LE; 33/407
(58) Field of Search .................................. 33/1 LE, 404, 33/407, 416, 417, 423, 430, 464, 479, 480, 484, 485

(56) References Cited

U.S. PATENT DOCUMENTS

| | | | |
|---|---|---|---|
| 422,852 A | * 3/1890 | Traut ............................ 33/464 |
| 496,714 A | 5/1893 | Allred | |
| 940,067 A | * 11/1909 | Richter ......................... 33/423 |
| 1,173,789 A | * 2/1916 | Fox ............................... 33/484 |
| 1,290,977 A | 1/1919 | Greene | |
| 1,686,441 A | * 10/1928 | Dauger et al. ................. 33/423 |
| 2,212,331 A | 8/1940 | Tracy | |
| 2,340,032 A | * 1/1944 | Witter ........................... 33/416 |
| 2,744,332 A | 5/1956 | Day | |
| 3,350,784 A | 11/1967 | Schabel | |
| 4,380,872 A | * 4/1983 | Moran .......................... 33/427 |
| 4,462,166 A | 7/1984 | Furlong | |
| 4,641,435 A | * 2/1987 | Brown .......................... 33/464 |
| 5,136,785 A | * 8/1992 | Shirley .......................... 33/404 |
| 5,359,782 A | 11/1994 | Langmaid | |
| 5,758,428 A | 6/1998 | Kotlinski | |
| 6,161,297 A | * 12/2000 | Boggs .......................... 33/474 |
| 6,293,028 B1 | * 9/2001 | Sylvia ........................... 33/417 |

FOREIGN PATENT DOCUMENTS

IT 719758 * 11/1966 ................. 33/1 LE

* cited by examiner

Primary Examiner—G. Bradley Bennett
(74) Attorney, Agent, or Firm—Aileen Champion Addessi

(57) ABSTRACT

A rafter tool and method for laying out rafters includes a first support bracket attached to a speed square with graduated markings, a second support bracket, and a string extendable therebetween. A guide member may be integrally formed with the first support bracket or may be a separate piece. The first support bracket has graduated markings and a notched arm. The first support bracket is positioned on a lower portion of the building, the second support bracket is positioned on an upper portion of the building and the string is extended therebetween. The extended string is secured to the notched arm, the angle that the string aligns with on the speed square is noted, and the rafter tool is moved from the building to a rafter board The guide member is used to pivot the first support bracket to align the string with the noted angle to lay out the rafter board.

20 Claims, 8 Drawing Sheets

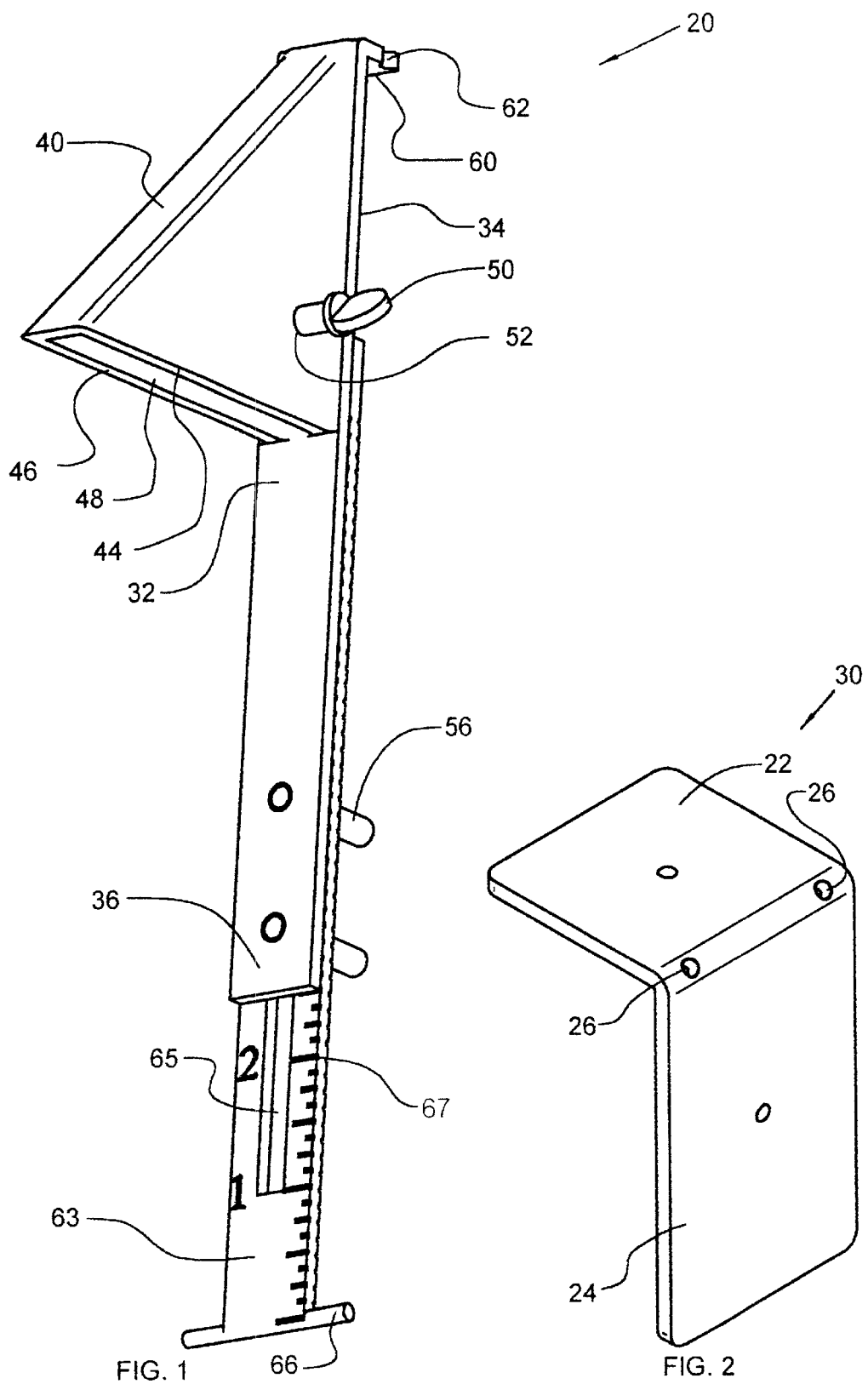

RAFTER TOOL AND METHOD

BACKGROUND OF THE INVENTION

The invention relates to roofing tools and, more particularly, to a tool for laying out boards for building rafters.

To lay out rafters for constructing a roof involves measuring and cutting boards for common rafters, valley rafters, hip rafters and jack rafters. Each rafter must be cut to the proper length with the correct angles and seat cut.

There are several kinds of tools which may be used to lay out rafters. One such device is a speed square which includes graduated markings for determining angles and lengths. The speed square is currently used in combination with a tape measure.

A rafter tool is disclosed in U.S. Pat. No. 2,744,332 entitled "Rafter Tool". The tool includes a main body having horizontal and vertical arms and a flexible rule. The tool is positioned on a plate member of a building and the flexible rule is pulled to the peak of the building. An aligning arm is clamped in position to defme the rafter angle. The tool is then moved to a board and the clamped aligning arm is laid on the board to transfer the size of the angle onto the board. However, the tool does not include graduated markings for noting the degree of the angle when the tool is positioned on the building and the tape rule is cumbersome and difficult to maneuver.

U.S. Pat. No. 4,462,166 entitled "Device for Measuring Lengths and Conforming Angles" discloses a tool having telescoping members to measure the distance between the peak of the building and the wall of the building. However, the telescoping members are cumbersome and difficult for one person to maneuver.

Therefore, what is needed is an apparatus and method for laying out rafters which utilizes at least one support bracket in combination with a lightweight, flexible extension member for providing a length and at least one angle for the roof rafter.

SUMMARY OF THE INVENTION

A rafter tool for use with a speed square having graduated markings includes a first support bracket attached to the speed square and positioned on a lower portion of the building. An extension member is extendable between the lower portion of the building and an upper portion of the building for providing a distance between the upper portion of the building and the lower portion of the building. The extension member is alignable with the graduated markings of the speed square for providing an angular measurement for a rafter board.

Additionally, the rafter tool may further include a second support bracket positioned on an upper portion of a building. The extension member extends between the first support bracket and the second support bracket.

The rafter tool further includes a guide member attached to the first support bracket and slidable along the rafter board for providing a pivot point for the rafter tool when laying out the rafter board.

A method for laying out rafters includes the steps of attaching a speed square to a first support bracket, positioning the first support bracket having a speed square attached thereto on a lower portion the building, and extending a string from the first support bracket to an upper portion of the building. After an angle on the speed square which aligns with the string is read, the first support bracket and the string is removed from the building.

The string from the upper portion of the building is positioned on one edge of the board and the first support bracket with an opposite end of the sting attached thereto is laid on the board. A guide member of the first support bracket is slid along the board until the string is pulled tight and the string is aligned with the angle read on the speed square by pivoting the first support bracket about the guide member for positioning the first support bracket on the board.

The board is marked along an edge of the speed square for laying out a first cut on the board and the board is marked along the first support bracket for laying out a second cut on the board for providing a seat cut to fit the board to the lower portion of the building.

The method may further include the steps of attaching the string to a second support bracket, which is positioned on the upper portion of the building for extending the string between the first and second support brackets. The method may further include marking an opposite end of the board along the speed square for laying out a third cut on the board for fitting the board to the upper portion of the building.

BRIEF DESCRIPTION OF DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is a view of a first support bracket of a rafter tool;

FIG. 2 is a view of a second support bracket of the rafter tool;

DESCRIPTION OF THE PREFERRED EMBODIMENT

The invention described herein provides an apparatus and method for laying out various types of roof rafters.

Figure 3:
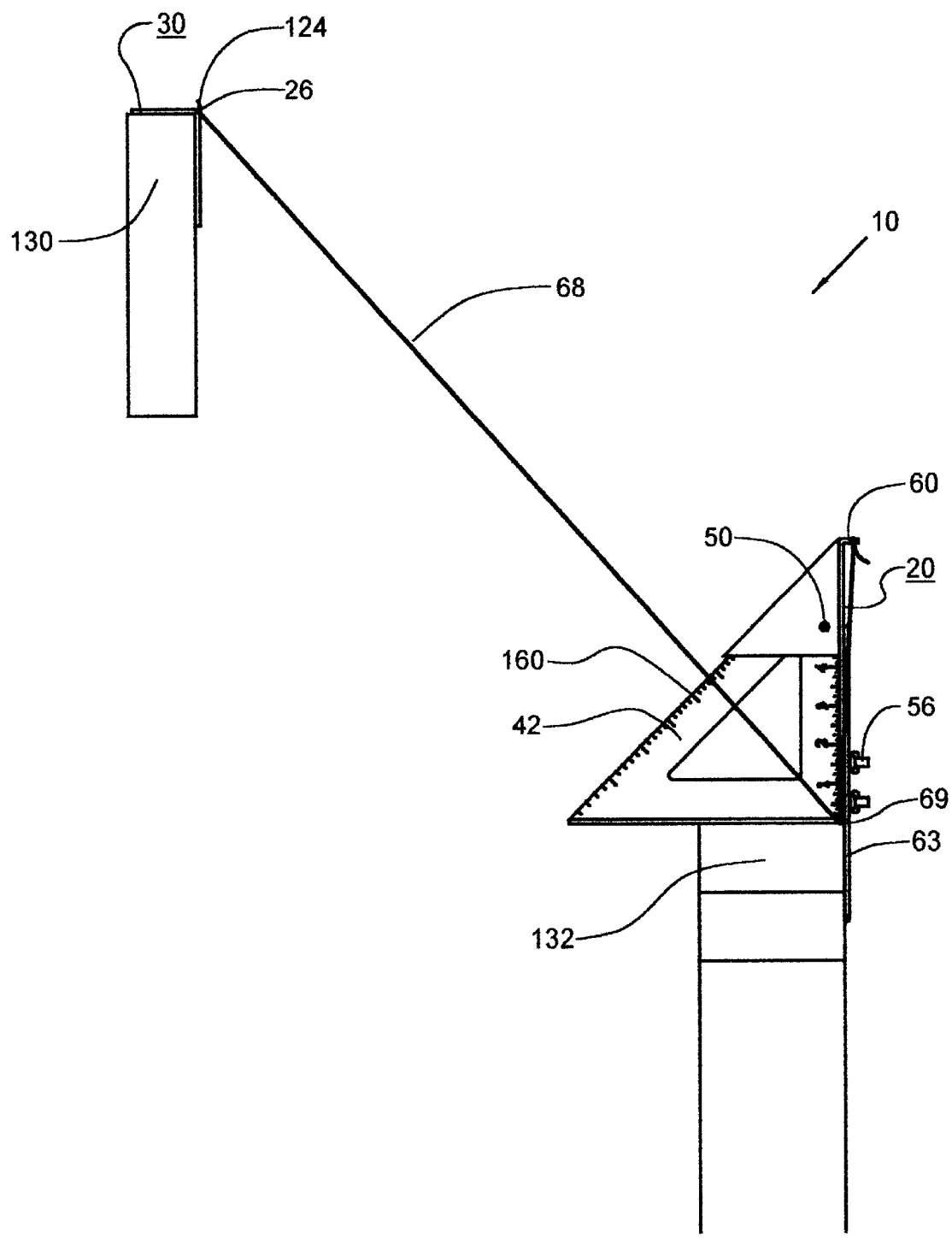
FIG. 3 is a view of the rafter tool including the second support bracket positioned on a peak of a building, a speed square inserted within the first support bracket which is positioned on a wall of the building, and an extension member extending therebetween for laying out common rafters.

Referring to FIGS. 1 and 3, a rafter tool 10 includes a first support bracket 20 which may be used by two people for laying out rafter boards. Referring to FIGS. 2 and 3, a second support bracket 30 may be used in combination with the first support bracket 20 for one person to lay out rafter boards.

The second support bracket 30 has a first arm 22 and a second arm 24 extending substantially perpendicular to one another. A hole 26, slot, or other type of aperture is positioned at the intersection of the first and second arms 22 and 24. Preferably, the hole 26 is located near an edge of the second support bracket 30.

The first support bracket 20 has a support arm 32 extending longitudinally and having a first end 34 and a second end 36. The first end 34 has a retaining bracket 40 positioned on a first side of the first support bracket 20 and is sized for retaining a speed square 42. As one example, the retaining bracket 40 may have a first arm 44, a second arm 46 and a slot 48 therebetween. The slot 48 is sized for engagement with the speed square 42. After the speed square 42 is inserted into the slot 48, a securement member 50, such as a thumb screw, set screw, or any other type of fastening means, is inserted into a hole 52 in one of the first and second arms 44 and 46 and is tightened for clamping the speed square 42 between the first and second arms 44 and 46 for securing the speed square 42 to the first support bracket 20.

The first support bracket 20 has a notched arm 60 positioned on a second side of the support arm 32 at the first end 34. The notched arm 60 has apertures 62, such as slots, holes, notches or the like, therethrough. The second end 36 of the first support bracket 20 has at least one fastener 56 extending therefrom.

The first support bracket 20 includes a slidable arm 63 having a hole, such as a slot 65. Preferably, the slot 65 extends longitudinally along the slidable arm 63 and is engagable with the fastener 56 for securing the support arm 32 and the slidable arm 63 together. Loosening the fastener 56 allows the slidable arm 63 to be extended or retracted. Tightening the fastener 56 enables the support arm 32 and the slidable arm 63 to be secured together.

The slidable arm 63 further includes a guide member 66 integrally formed with the slidable arm 63 and extending substantially perpendicularly from at least one edge of the slidable arm 63. The guide member 66 may extend from both edges of the slidable arm 63 forming a T-shaped arm.

The slidable arm 63 has graduated markings 67 for enabling a person to visually adjust the slidable arm 63 with respect to the support arm 32 and with respect to the size of the board for laying out the rafter board.

Referring again to FIG. 3, an extension member, such as a string 68 or other type of elongated member, extends between the second support bracket 30 and the first support bracket 20. Preferably, the string 68 is removably attached to the second support bracket 30 by threading the string 68 through the hole 26 of the second support bracket 30 and knotting the string so that the string remains positioned within the hole 26. The opposite end of the string 68 is extended to the 90° angle edge 69 or pivot point of the speed square 42 and secured to the first support bracket 20, such as through the slot 65 adjacent to the 90° corner of the speed square. The excess string may be wrapped around the notched arm 60 keeping the distance accurate and for convenient storage of the string.

For the various embodiments of this invention, the same reference characters will be used to designate like parts. In addition, like functions and like interactions of the parts among the various embodiments of this invention will not be repeated for each embodiment.

Figure 4:
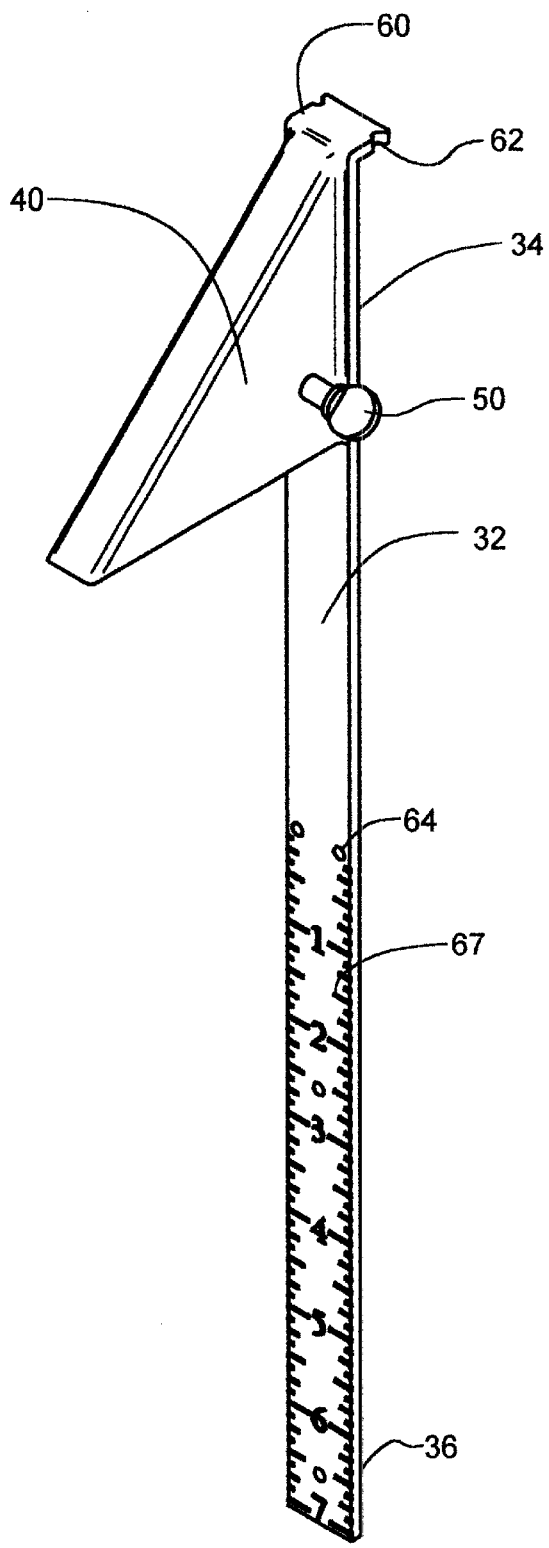
FIG. 4 is a view of an alternative embodiment of the first support bracket of the rafter tool.
Figure 5:
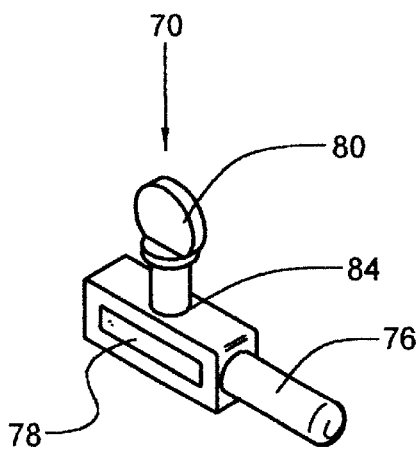
FIG. 5 is a view of a guide member of the rafter tool for engagement with the first support bracket of FIG. 4.
Figure 6:
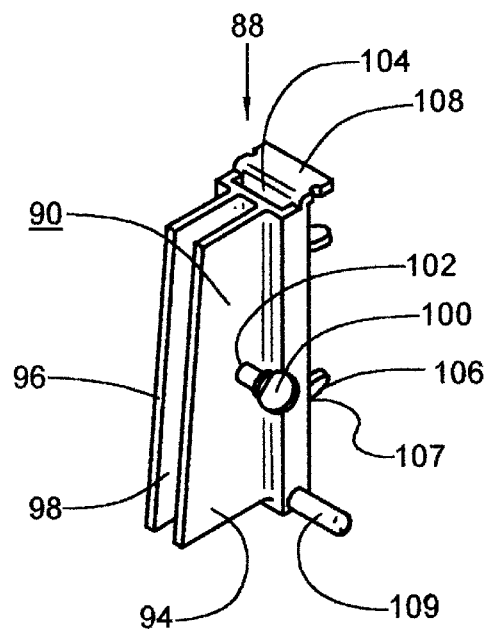
FIG. 6 is a view of a third support bracket having the guide member integrally formed therewith.

Referring to FIGS. 4, 5, and 6, and using the same reference characters to define like parts, an alternative embodiment of the first support bracket 20 of the rafter tool 10 as illustrated in FIG. 1 may be a rafter tool having only the support arm 32 of the first support bracket 20, a guide member 70, and a third support bracket 88. For this embodiment, the support arm 32 includes at least one hole 64, such as an aperture, slot or the like positioned at various locations between the first and second ends 34 and 36 of the support arm 32 for engagement with the string 68. The support arm 32 may include the graduated markings 67.

Referring to FIG. 5, an alternative embodiment of the rafter tool 10 includes the guide member 70 being a separate piece which is adjustably attached to the second end 36 of the first support bracket 20. The guide member 70 includes an elongated member 76 at one end and a slidable member 78 at an opposite end. The guide member 70 may be attached to the first support bracket 30, for example, by the slidable member 78 having a slot, hole or other sliding means for enabling the guide member 70 to slide back and forth along the support arm 32. A securement member 80 is positioned within a hole 84 of the guide member 70 for clamping the guide member 70 to the first support bracket 20. As an alternative to the slidable member 78, the guide member 70 may be attached by mechanical means, such as pins, screws or the like extending from the guide member 70 and inserted through a hole of the support arm 32, or by any other suitable means.

Referring to FIG. 6, the third support bracket 88 includes a retaining bracket 90 sized for retaining the speed square 42. As one example, the retaining bracket 90 may have a first arm 94, a second arm 96 and a slot 98 therebetween. The slot 98 is sized for engagement with the speed square 42. After the speed square 42 is inserted into the slot 98, a securement member 100, such as a thumb screw, set screw, or any other type of fastening means, is inserted into a hole 102 in one of the first and second arms 94 and 96 and is tightened for clamping the speed square 42 between the first and second arms 94 and 96 for securing the speed square 42 to the third support bracket 88.

The third support bracket 88 has an opening 104 sized for insertion of the support arm 32 of the first support bracket 20 for slidably attaching the third support bracket 88 to the first support bracket 20. A securement member 106, such as a bolt, screw or the like, is inserted through a hole 107 for contact with the first support bracket 20 for securing the third support bracket 88 to the first support bracket 20.

As one example, the third support bracket 88 further includes a notched arm 108 and a guide member 109 integrally formed therewith. The notched arm 108 is similar to the notched arm 60 and the guide member 109 is similar to the guide member 70.

As an alternative to the third support member 88 being slidably attached to the first support bracket 20, the third support member 88 may be attached by screws 106, pins or the like extending from the retaining bracket 90 and inserted through holes of the support arm 32 or by any other type of fastening means.

Figure 7:
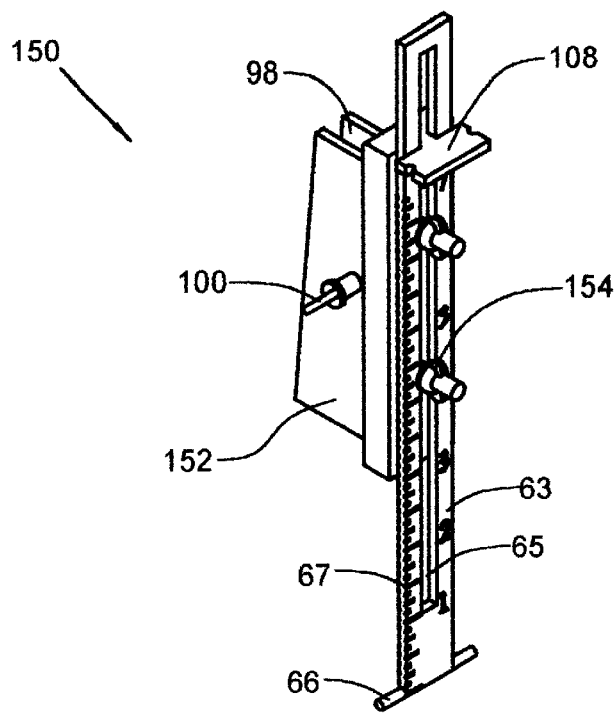
FIG. 7 is a view of an alternative embodiment of the rafter tool.

Referring to FIG. 7 and using the same reference characters to define like parts, another alternative embodiment of the rafter tool 10 is a rafter tool 150. The rafter tool 150 includes the slidable arm 63 with the guide member 66 and the graduated markings 67. The rafter tool 150 includes a fourth support bracket 152 with the notched arm 108 and the slot 98 for retaining the speed square 42. The fourth support bracket 152 is secured to the slidable arm 63 by fastener 154.

In operation, referring again to FIG. 3, to lay out a common rafter, the string 68 is inserted through the hole 26 in the second support bracket 30 and knotted. The second support bracket 30, having a knot 124 positioned on the outside of the second support bracket 30, is placed on an upper portion or the ridge board 130 of the building and may be manually held, screwed, nailed or otherwise attached to the board 130. If the second support bracket 30 is not used, then a person needs to hold the knotted end 124 of the string 68 on the upper portion of the building.

The speed square 42 is attached to the first support bracket 20 by inserting the speed square 42 into the slot 48 and tightening the securement member 50 against the speed square 42. The string 68 is inserted through the slot 65 or through at least one of the holes 64 in the first support bracket 20 and the first support bracket 20 is placed on a lower portion or the wall 132 of the building. The string 68 is pulled tight and wrapped around the slots in the notched arm 60 to secure the string 68.

The string 68 aligns with one of the graduated degree markings 160 on the speed square 42. This degree is read and written down for future use. This provides a measurement of the angle of the roof, which can be used to lay out the rafter board, without having to perform pitch and rise calculations.

Figure 8:
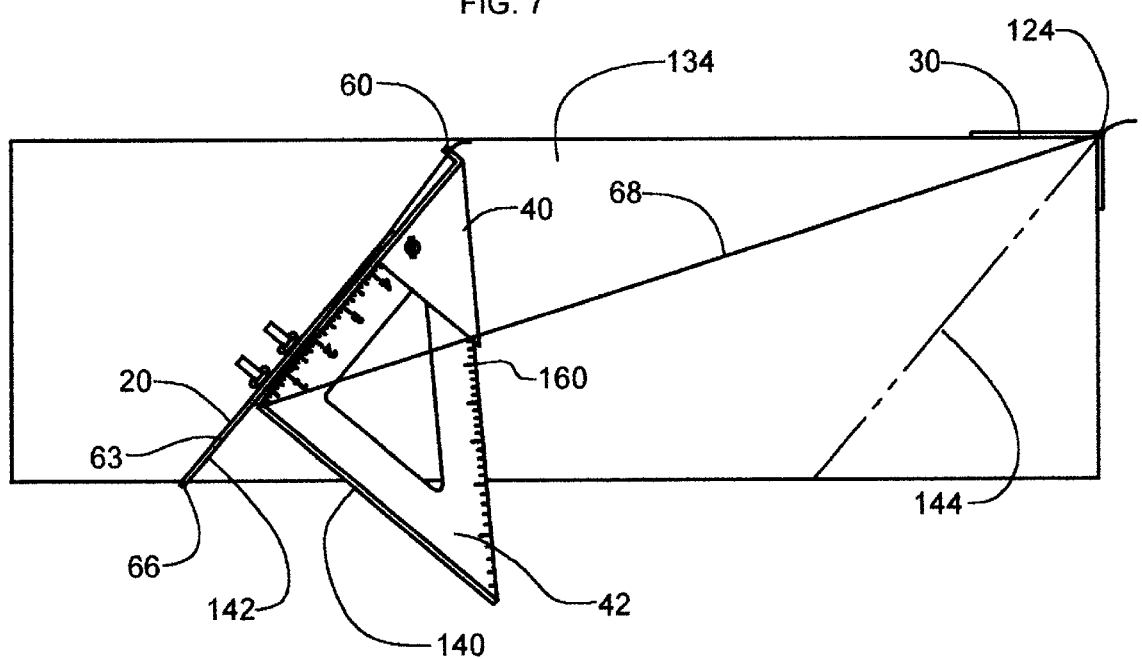
FIG. 8 is a view of the rafter tool positioned on a board for laying out a common rafter.

Referring to FIG. 8, the first and second support brackets 20 and 30 are removed from the building and are laid on a rafter board 134. The guide member 66 is positioned to the required distance depending on the desired heel cut. The guide member 66 is secured in position by tightening the fastener 56.

The second support bracket 30 is positioned on an end of the board 134 having the knot 124 of the string 68 positioned at a corner of the board 134. The first support bracket 20 is extended along the board 134 allowing the guide member 66 to slide along the edge of the board until the string 68 is tight The guide member 66 acts as the pivot point and controls the placement of the rafter tool 10.

The string 68 is aligned with the degree marking 160 on the speed square 42 which was read when the rafter tool 10 was positioned on the building When the string 68 is aligned, the position of the speed square 42 is adjusted accordingly resulting is the seat or birds mouth cut being formed by an edge 140 of the speed square 42 and by an edge 142 of the first support bracket 20. The seat cut is traced with a pencil onto the board 134 for marking a first and second cut.

Remove the speed square 42 from the rafter tool 10 and use the speed square 42 to find the angle of the back heel mark Then put the same angle as the heel on the top corner of the board 134 where the knot 124 was located for marking a third cut 144 for cutting the board to fit adjacent the ridge board 130. Measure from the seat cut the desired overhang for the board 134 and using the same angle as the heel, lay out the opposite end of the board for the overhang. Cut the board according to the traced marks and re-check for accuracy.

As an alternative to the use of the first support bracket 20 as illustrated in FIG. 1, the support bracket illustrated in FIG. 4 may be used alone or in combination with the guide member 70 illustrated in FIG. 5 and the third support bracket 88 illustrated in FIG. 6. As yet another alternative, the first support bracket 150 illustrated in FIG. 7 may be used.

Depending on the type of rafter to be laid out, the upper portion of the building may be interpreted as the ridge 130, as a hip, or as a valley. The lower portion of the building may be interpreted as the wall 132, or as the valley.

Figure 9:
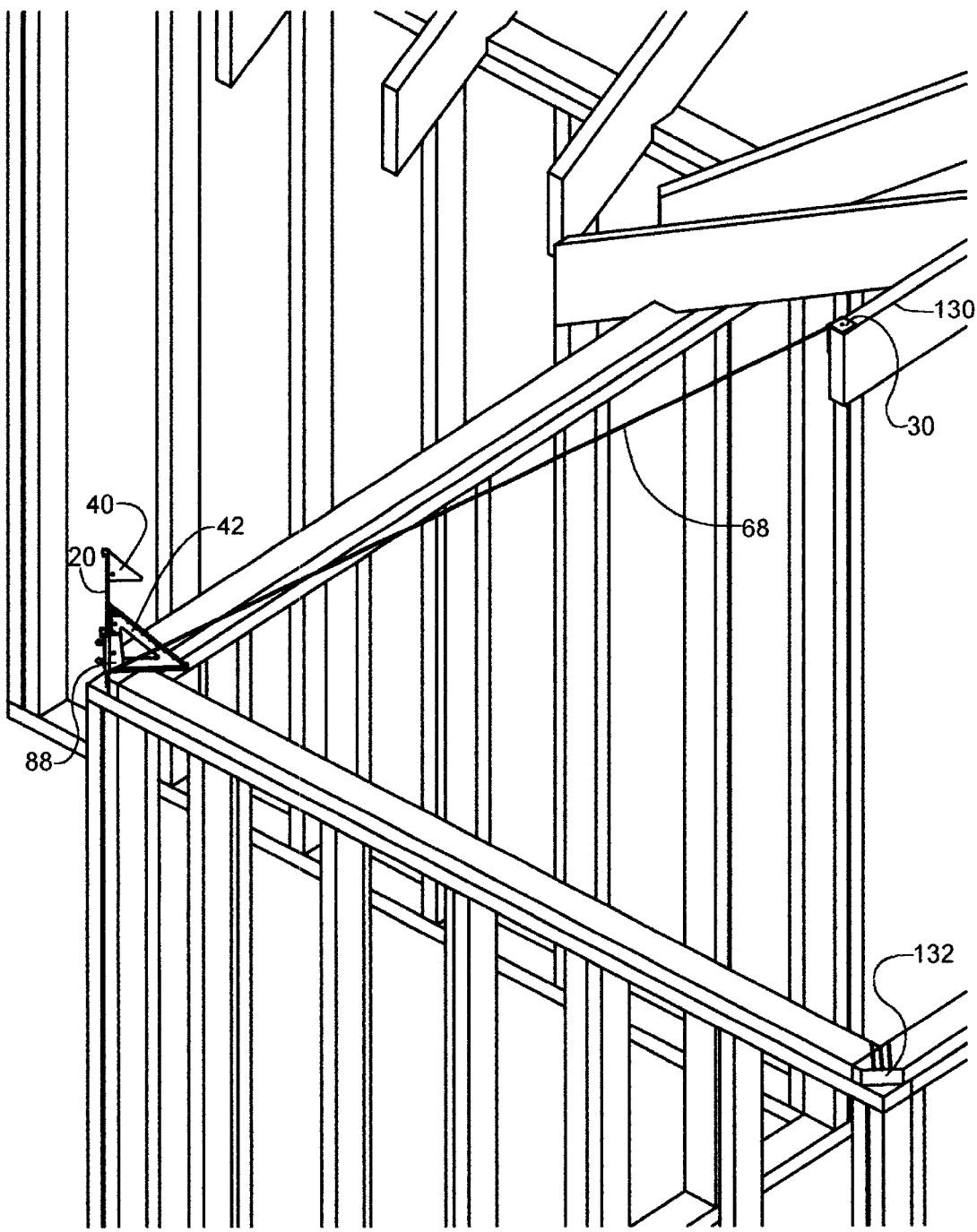
FIG. 9 is a view of the rafter tool positioned on a building showing a speed square attached to the third support bracket for laying out hip rafters.

Referring to FIG. 9, to lay out a hip rafter for a building, on the outside corner of the wall 132 or lower portion of the building, cut the top plate of the wall at a 45° angle for seating the rafter board on the wall. The sidable arm 63 is retracted along the support arm 32 or, alternatively, the third support bracket 88 is secured to the first support bracket 20 having the slot 98 extend from either the first side or the second side. Preferably, the speed square 42 is positioned approximately 1½ inches from the second end 36 of the support arm 32 for enabling the second end 36 to seat within the cut top plate of the wall. Measure the position on the ridge for placement of the hip rafter Mark the plumb line. Position the second support bracket 30 on the upper portion of the building or the ridge where the plumb mark is. Secure the second support bracket 30 to the ridge 130, such as with nails, screws, etc.

The string 68 is put through the slot 65, wrapped around the 90° pivot point of the speed square and wrapped around the notched arm 108, or inserted through one of the holes 64 on the first support bracket 20 and secured to the second support bracket 30. The string 68 is pulled tight and the first support bracket 20 along with the attached string 68 is secured to the corner of the wall 132. The string 68 is wrapped around the notched arm 60 or 108 for securing the string 68 to the first support bracket 20. Note the degree that the string 68 aligns with on the speed square 42, making sure that the string 68 is in line with the 45° mark.

Figure 10:
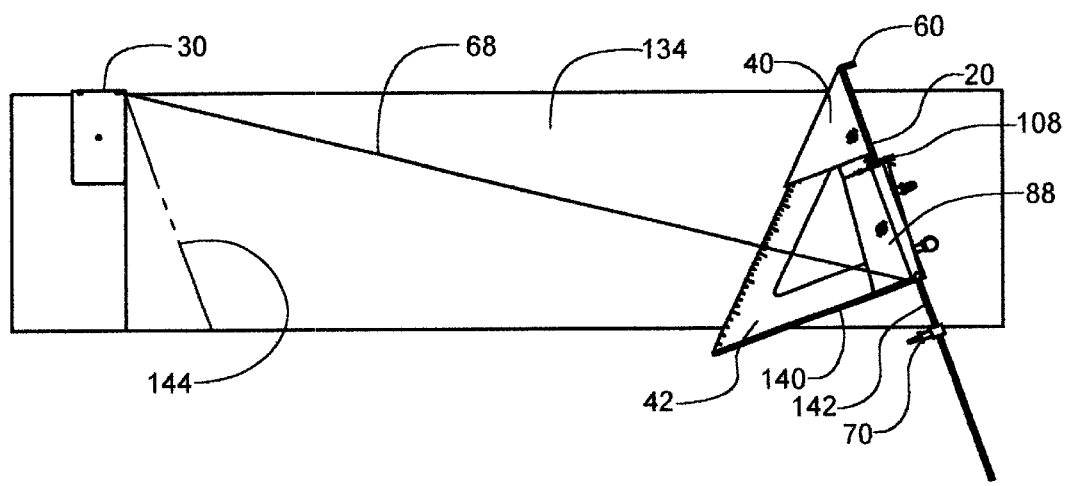
FIG. 10 is a view of the rafter tool positioned on a board for laying out a hip rafter.

Referring to FIG. 10, remove the rafter tool 10 from the building and lay the rafter tool 10 on a hip rafter board. If the third support bracket 88 is being used, slide the speed square 42 up into the retaining bracket 40 and secure it thereto. Attach the guide member 70 to the first support bracket 20. Alternatively, if the rafter tool 10 with the slider arm 63 is used, remove the rafter tool 10 from the building and lay on the board 134. Lay out the board in the same manner as a common rafter, except reduce the length of the slidable arm 63 by ¼" to compensate for the difference between the common scale and the hip scale on the speed square 42.

Figure 11:
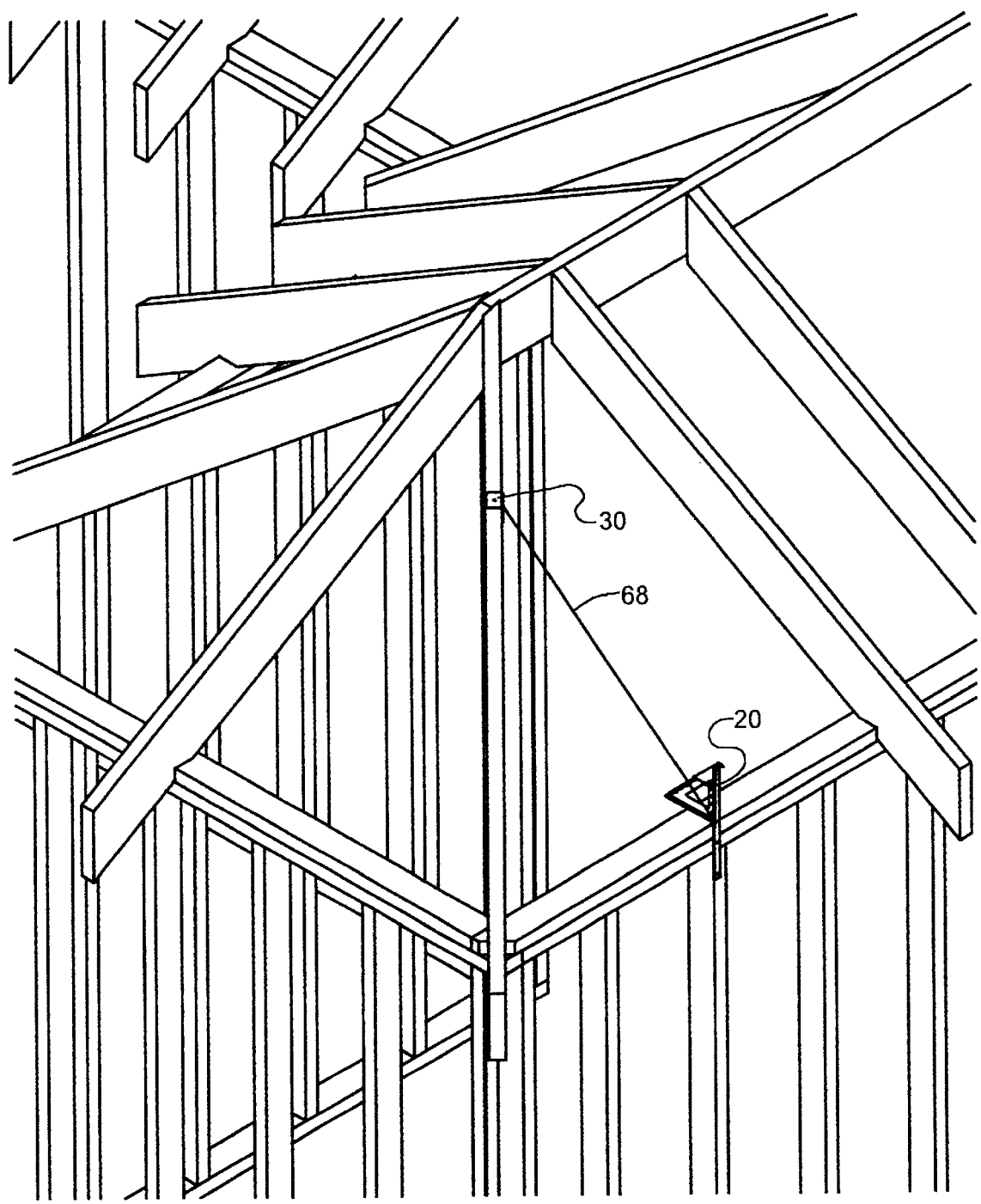
FIG. 11 is a view of the rafter tool positioned on a building for laying out jack rafters.

Referring to FIG. 11, to lay out a jack rafter, the desired distance between rafter boards is measured and marked along the upper portion of the building and the lower portion of the building. The second support bracket 30 is secured to the upper portion of the building on the measured mark with the string 68 secured beside the measured mark on the hip rafter. The first support bracket 20 is positioned on the wall and the string 68 is pulled tight. After the string is secure, the length of the string will be the distance for the jack rafter. The same degree will be used for the jack rafter as was used for the common rafter. After the rafter tool 10 is removed from the building and placed on a board, the same procedure is used as with laying out the common rafter, except that a 45° cut may need to be made.

Figure 13:
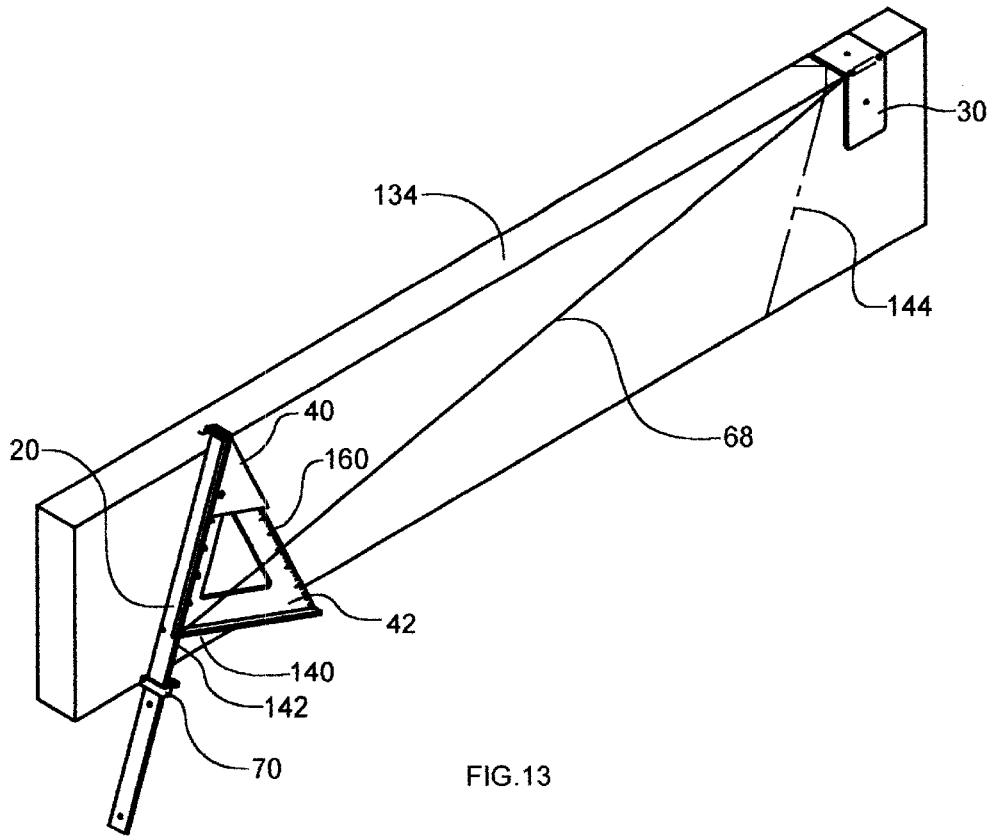
FIG. 13 is a view of the rafter tool positioned on a board for laying out a valley rafter.
Figure 12:
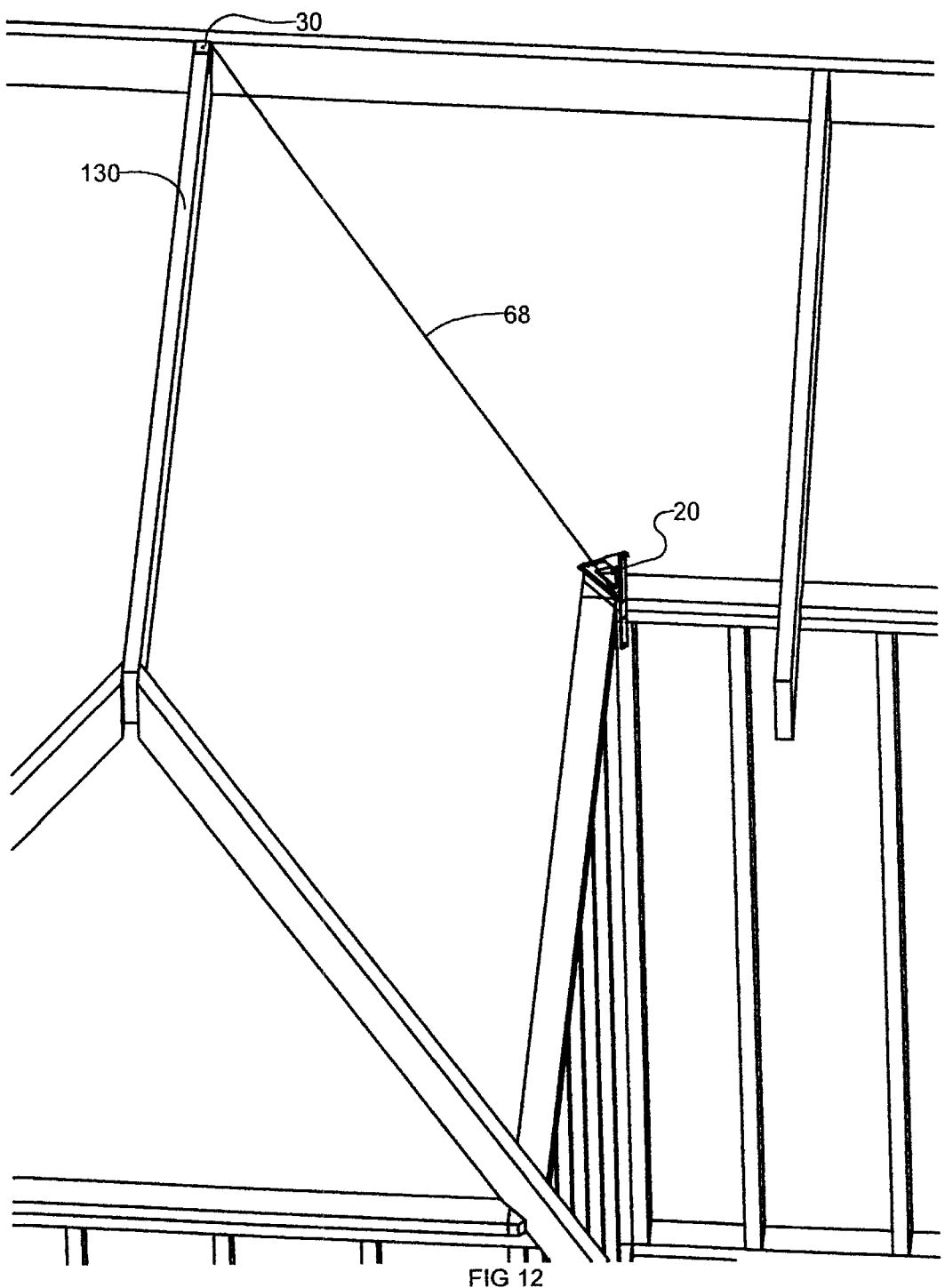
FIG. 12 is a view of the rafter tool positioned on a building for laying out valley rafters.

Referring to FIG. 12, to lay out a valley rafter, follow the same procedure as with a common rafter, except reduce the length of the slidable arm 63 by ¼" to compensate for the difference between the common scale and the hip scale on the speed square 42. When on the wall of the valley corner, mark a diagonal line from the inside corner to the outside corner. Place the rafter tool 10 to the left or right of the mark. This will represent the width of the rafter board thickness. Position the second support bracket 30 on the ridge 130 of the building. The end of the string 68 should be put in the corner of the ridge where both ridges meet Referring to FIG. 13, for a double compound cut, or bevel cut, put the second support bracket 30 2 to 3 inches back from the end of the rafter board 134 and secure.

Trace a line across the top of the board, along the string end of the second support bracket 30. At the midpoint of the traced line, measure and mark 45° lines to each edge of the board Mark the same angle as the heel cut down both sides of the board, mark a third cut 144, and cut at 45° with a saw.

An advantage of the rafter tool 10 is that the rafter tool 10 is compact and convenient to carry around. The rafter tool 10 will fit into a tool pouch To lay out the rafters, all that is needed is the rafter tool 10 including a string, a speed square and a pencil.

Also, the rafter tool 10 is easy to use and does not require a person to know geometry or to use a tape measure. The rafter tool 10 reduces the time needed to lay out a rafter saving time and money.

Another advantage is that the rafter tool 10 may be used with one person or two people.

Thus there has been shown and described a novel rafter tool and method which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A rafter tool for use with a speed square having graduated markings, comprising:
    a first support bracket attachable to the speed square for positioning near a lower portion of a building; and
    an extension member extendable between the lower portion of the building and an upper portion of the building for providing a distance between the upper portion of the building and the lower portion of the building, said extension member alignable with the graduated markings of the speed square for providing an angular measurement for a rafter board.

2. The rafter tool according to claim 1, further comprising:
    a second support bracket for positioning near the upper portion of the building; and
    said extension member extending between said first support bracket and said second support bracket.

3. The rafter tool according to claim 1, further comprising a guide member attached to said first support bracket, said guide member slidable along the rafter board for providing a pivot point for the rafter tool when laying out the rafter board.

4. The rafter tool according to claim 1, wherein said extension member is a string.

5. The rafter tool according to claim 1, wherein:
    said first support bracket includes a retaining bracket with a slot and a support arm with at least one hole;
    said second support bracket has an aperture;
    the speed square engagable within said slot of said retaining bracket of said first support bracket; and
    said extension member inserted through said aperture of said second support bracket, through said at least one hole of said first support bracket, and secured thereto.

6. The rafter tool according to claim 5, further comprising a slidable arm attached to said support arm of said first support bracket, said slidable arm having a slot and at least one fastener for enabling said slidable arm to telescopically move with respect to said support arm.

7. The rafter tool according to claim 1, wherein said first support bracket has a notched arm for holding said extension member in position.

8. The rafter tool according to claim 1, wherein said first support bracket has graduated markings.

9. The rafter tool according to claim 1, further comprising a third support bracket slidably attached to said first support bracket and having a retaining bracket for securing the speed square to the first support bracket, said third support bracket having a notched arm and a guide member integrally formed therewith.

10. A rafter tool for use with a speed square having graduated markings, comprising:
    a first support bracket attachable to the speed square for positioning near a lower portion of a building, said first support bracket having a retaining bracket at one end and at least one hole at an opposite end, the speed square engagable with said retaining bracket for securing the speed square to said first support bracket;
    a guide member attached to said first support bracket for providing a pivot point for said rafter tool on a rafter board;
    a second support bracket for positioning near an upper portion of the building, said second support bracket having at least one aperture; and
    a string inserted through said aperture of said second support bracket and through said at least one hole of said first support bracket, said string extendable between said first support bracket and said second support bracket for providing a distance between the upper portion of the building and the lower portion of the building, said extension member alignabie with the graduated markings of the speed square for providing an angular measurement for the rafter board.

11. The rafter tool according to claim 10, further comprising:
    a third support bracket having,
        a slidable member engagable with said first support bracket for securing said third support bracket to said first support bracket;
        a notched arm for securing said string thereto; and
        a retaining bracket engagable with the speed square for securing the speed square to said first and third support brackets.

12. The rafter tool according to claim 10, wherein:
    said first support bracket has a support arm extending longitudinally from said retaining bracket for providing a measurement for a first cut of a seat cut; and
    the speed square has an edge extendable perpendicularly from said first support bracket for providing a measurement for a second cut of the seat cut.

13. The rafter tool according to claim 10, wherein said first support bracket has a notched arm for holding said string in position.

14. The rafter tool according to claim 10, wherein said guide member is integrally formed with said first support bracket.

15. A method for laying out rafters, comprising the steps of:
    attaching a speed square to a first support bracket;
    positioning said first support bracket having a speed square attached thereto on a lower portion the building;
    extending a string from said first support bracket to an upper portion of the building;

reading an angle on the speed square which aligns with said string;

removing said first support bracket and said string from the building;

positioning said string from the upper portion of the building on one edge of the board;

laying said first support bracket with an opposite end of said string attached thereto on the board;

sliding a guide member of said first support bracket along the board until said string is pulled tight;

aligning said string with the angle read on the speed square by pivoting said first support bracket about said guide member for positioning said first support bracket on the board;

marking the board along an edge of the speed square for laying out a first cut on the board; and marking the board along said first support bracket for laying out a second cut on the board for providing a seat cut to fit the board to the lower portion of the building.

16. The method according to claim 15, further comprising:

moving the speed square to an opposite end of the board; and marking the board along the speed square for laying out a third cut on the board for fitting the board to the upper portion of the building.

17. The method according to claim 15, further comprising:

attaching said string to a second support bracket;

positioning said second support bracket on the upper portion of the building;

extending said string from said first support bracket to said second support bracket;

removing said second support bracket from the building after the angle is read from the speed square; and positioning said second support bracket on an edge of the board having said string positioned at an edge of the board for laying out the rafter board.

18. The method according to claim 15, wherein the steps of positioning said first and second support brackets include positioning said second support bracket on a ridge of the building and positioning said first support bracket on a wall of the building for laying out rafters.

19. The method according to claim 15, further comprising the steps of:

positioning said string around a 90° corner of the speed square after said string is extended between the upper and lower portions of the building, and wrapping said string around a notched arm of said first support bracket after said string is pulled tight.

20. The method according to claim 15, further comprising the step of attaching a guide member to said first support bracket after said first support bracket is removed from said lower portion of the building.

* * * * *